United States Patent [19]

Genslak

[11] 4,124,000
[45] Nov. 7, 1978

[54] MIXED CYCLE STRATIFIED CHARGE ENGINE WITH IGNITION ANTECHAMBER

[75] Inventor: Stanley L. Genslak, Utica, Mich.

[73] Assignee: General Motors Corporation, Detroit, Mich.

[21] Appl. No.: 738,613

[22] Filed: Nov. 3, 1976

[51] Int. Cl.$^2$ .......................... F02B 3/02; F02B 23/10
[52] U.S. Cl. ............................ 123/32 ST; 123/32 SP; 123/191 S
[58] Field of Search ............ 123/32 ST, 32 SP, 32 K, 123/32 L, 75 B, 191 S, 191 SP

[56] References Cited

U.S. PATENT DOCUMENTS

| | | | |
|---|---|---|---|
| 1,782,395 | 11/1930 | Bullington | 123/191 SP |
| 2,758,576 | 8/1956 | Schlamann | 123/32 ST |
| 2,803,230 | 8/1957 | Bensinger | 123/32 ST |
| 2,808,037 | 10/1957 | von Seggern et al. | 123/32 SP |
| 2,893,360 | 7/1959 | Muller | 123/32 SP |
| 3,102,521 | 9/1963 | Slemmons | 123/32 SP |
| 3,580,230 | 5/1971 | Hoffman | 123/32 SP |
| 3,933,134 | 1/1976 | Tagi et al. | 123/75 B |
| 4,034,733 | 7/1977 | Noguchi et al. | 123/32 SP |
| 4,038,959 | 8/1977 | Takizawa et al. | 123/191 S |

FOREIGN PATENT DOCUMENTS 1,055,289 4/1959 Fed. Rep. of Germany ....... 123/32 SP

*Primary Examiner*—Charles J. Myhre
*Assistant Examiner*—P. S. Lall
*Attorney, Agent, or Firm*—Robert J. Outland

[57] ABSTRACT

A mixed cycle engine has a divided combustion chamber including a turbulence prechamber in which fuel is mixed with air and burned upon injection at compression ratios preferably between those of conventional diesel and gasoline engines. To provide positive ignition of the injected fuel, a small antechamber is provided which contains a spark plug and the fuel injection nozzle and is connected to the prechamber by an orifice through which the nozzle is arranged to direct the charge of fuel into the prechamber. The orifice is sized so that air flow passing from the prechamber to the antechamber near the end of the compression stroke peels off some of the fuel at the beginning of injection and carries it into the antechamber, forming a combustible mixture which is easily ignited by the spark plug in the relatively quiescent antechamber.

3 Claims, 4 Drawing Figures

MIXED CYCLE STRATIFIED CHARGE ENGINE WITH IGNITION ANTECHAMBER

This invention relates to internal combustion engines and, more particularly, to mixed cycle engines wherein advantageous characteristics of diesel cycle combustion are provided in lower compression ratio spark ignited engines.

It is known in the engine art that diesel engines generally obtain substantially greater fuel economy than comparable spark ignition engines because of unthrottled operation at relatively high compression ratios. However, because diesel engines rely on compression ignition, they are often difficult to start when cold and are noisy. To obtain good ignition and provide adequate cold starting, compression ratios must be higher than required for best efficiency. This requires increased strength and weight of engine components and increases engine friction and noise.

Numerous proposals and attempts have been made to provide spark ignition engines which are capable of running unthrottled to approach the economy of diesel combustion in lower compression ratio engines. In order to ignite the air-fuel mixture in such an engine at part load, where the overall ratio becomes very lean, it is necessary to stratify the air-fuel charges by providing locally richer portions closer to stoichiometry which are capable of being ignited by a spark plug. Some engines provide such charge stratification by control of air-fuel motion in the cylinder, while others provide various forms of divided combustion chambers wherein a portion of the clearance volume comprises a prechamber into which all the fuel is injected. With such arrangements, as in prechamber diesel engines, the prechamber usually contains after fifty percent of the total clearance volume of the cylinder.

A major problem of both open chamber and prechamber type fuel injected stratified charge engines has been a lack of reliable ignition. Spark plug gap locations and spark energy requirements have been found to be critical in order to achieve reliable ignition. In many cases, this has required extended electrode lengths and higher energy levels, which cause spark plug durability problems. In addition, variations in air-fuel ratios at the spark plug gap generally require throttling of the engine air charge under at least some conditions of engine operation.

The present invention provides a novel mixed cycle moderate compression engine combustion chamber arrangement wherein a high efficiency turbulent prechamber stratified charge combustion chamber arrangement is provided with a small antechamber in which a quiescent air-fuel mixture of relatively constant air-fuel ratio is developed and ignited by conventional spark ignition means so as to provide positive ignition of the main air-fuel charge near the beginning of the fuel injection period. The ignition antechamber arrangement provides a protected area away from the turbulence of the prechamber where ignition can take place easily, and from which combustion can be quickly carried into the prechamber for ignition of the main charge. The arrangement provides the high efficiency and low emissions of nonthrottled stratified charge operation while giving positive ignition under varying loads. A compression ratio higher than conventional gasoline engines but substantially lower than diesels results in lower noise levels and structural weight than comparable diesel engines with greater efficiency than conventional gasoline engines.

These and other features and advantages of the invention will be more fully understood from the following description of certain preferred embodiments taken together with the accompanying drawings.

Figure 1:
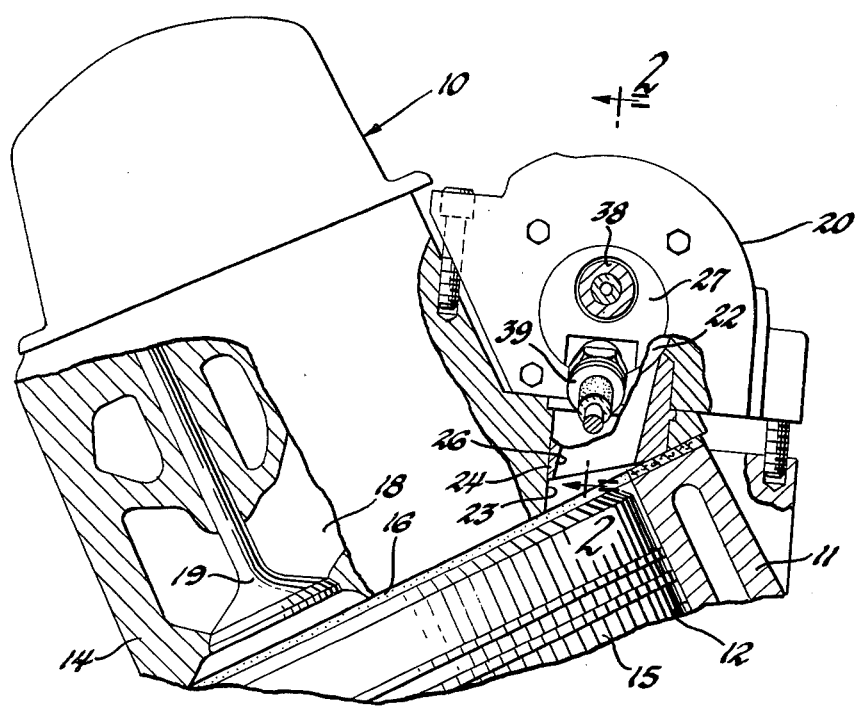
FIG. 1 is a fragmentary end view partially in section showing one cylinder of an internal combustion engine formed according to the invention.
Figure 2:
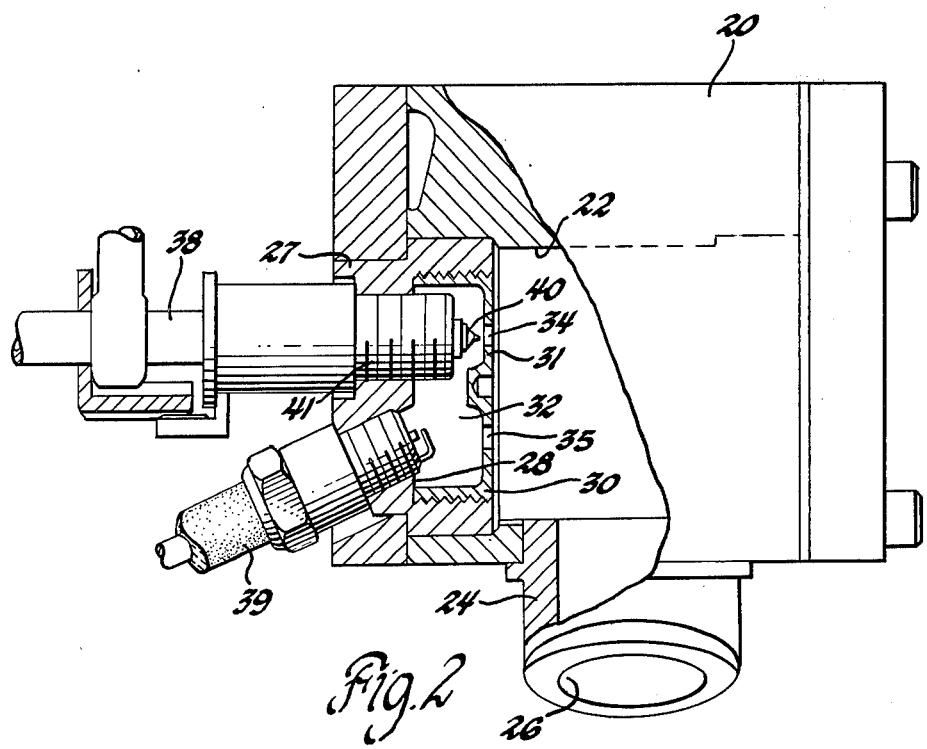
FIG. 2 is a partial side view of the engine of FIG. 1 showing the prechamber and its associated ignition antechamber partly sectioned in the plane indicated by the line 2—2 of FIG. 1.

Referring now more particularly to FIGS. 1 and 2 of the drawings, there is shown an internal combustion engine 10 of the mixed cycle type, formed according to the invention through modification, for test purposes, of a conventional automotive gasoline engine. Engine 10 includes a cylinder block 11 defining a cylinder 12. A cylinder head 14 mounted on the top face of the block closes the end of the cylinder. A piston 15, provided the cylinder for reciprocation therein, cooperates with the cylinder and the cylinder head to define at the end of the cylinder a variable volume main combustion chamber 16 which is filled with air and emptied of combustion products through ports 18 controlled by valves 19 carried in the cylinder 14 in conventional fashion.

Mounted on the cylinder head 14 is a housing 20 that defines internally a generally cylindrical precombustion chamber (prechamber) 22. Prechamber 22 is connected with the main combustion chamber 16 through a passage 23 in the cylinder head in which is disposed an insert 24 having therein a cylindrical orifice passage 26. Passage 26 opens nearly tangentially into the prechamber 22 and is relatively large to limit pumping losses while generating a substantial amount of swirl and turbulence in the prechamber when air is forced from the main chamber into the prechamber during the piston compression stroke. The volume of the prechamber is preferably from about 40 to about 60 percent of the total clearance volume when the piston is at top dead center. Thus, the main chamber minimum volume and the prechamber constant volume are approximately equal, but their relative sizes may be varied slightly to obtain the best combustion and performance characteristics. The total clearance volume is preferably related to the piston displacement so that the cylinder compression ratio is in the range of about 13 of 14:1, which, it is thought, will give the best overall brake efficiency for an engine of this type. However, any desired compression ratio may be used with this chamber arrangement.

At one end of the housing 20 an antechamber body member 27 is disposed at the end of the prechamber 22. Member 27 defines a recess 28 which is closed by a threaded insert 30 having a wall 31 between the recess 28 and the prechamber 22, thus forming an enclosed ignition antechamber 32. The antechamber and prechamber are connected by first and second orifices 34, 35 which are provided at spaced locations in the wall 31 for reasons to be subsequently described.

The antechamber body member 27 mounts in adjacent positions extending externally of the housing 20, a fuel injection nozzle 38 and a spark plug 39, both of which extend into positions within the antechamber 32. The injection nozzle has a single hole tip 40 that is located close to, but longitudinally spaced from, the first orifice 34 so that fuel injected by the nozzle is directed through the orifice and into the prechamber 22. An adjustable mounting sleeve 41 permits adjustment of the injector nozzle position. Orifice 34 is sized so that it is large enough to pass the jet of fuel injected from the single hole fuel nozzle 38, but without excessive clearance around the jet of injected fuel. The spark plug 39 is positioned beside the fuel nozzle in an arrangement which allows the ignition antechamber to be made as small as reasonably possible, while containing both the spark ignition gap and the fuel nozzle. The second orifice 35, provided in wall 31, is merely for the purposes of pressure relief, and supplements the action of the first orifice 34 in this respect. Orifice 35 is sized, as necessary to obtain the desired freedom of flow between the prechamber and antechamber in order to minimize pumping losses. The size of the antechamber is preferably less than 25 percent of the volume of the prechamber and, as previously mentioned, will normally be made as small as possible to accomplish its purpose.

The operation of the engine arrangement of FIGS. 1 and 2 is as follows:

Air is drawn into the main combustion chambers 16 on the intake downstroke of the piston 15 and is subsequently compressed as the piston moves upwardly on its compression stroke. This action forces some of the air through the main orifice passage 26 and into the prechamber 22, where it is directed in a swirling turbulent motion. As the compression process proceeds, the pressure increases in all parts of the chamber and some of the air is forced from the prechamber through the orifices 34, 35 into the ignition antechamber 32.

Near the end of the compression stroke, but while the movement of air still continues, the injection of fuel through the nozzle 38 begins with a single jet being directed from the spray tip 40 through the first orifice 34 and into the prechamber 22, where it immediately begins to mix with the swirling turbulent mass of air. However, the flow of air due to compression through the orifice 34, in direction opposite to the direction of the fuel jet, strips or peels off some of the fuel spray around the edges and carries it into the antechamber 32 where it quickly forms a combustible mixture adjacent the spark plug gap. Thus only moments after the beginning of fuel injection, the spark plug 39 is fired, igniting the combustible mixture formed in the antechamber. Combustion of this mixture pressurizes the antechamber and ignites the jet of injected fuel at its edges as it passes through the orifice 34, causing a stream of fuel and burning fuel-air mixture to pass through the orifice 34 into the prechamber where mixture with the turbulent air causes immediate and rapid combustion. Ignition of the charge may be further aided by the expulsion of burning products through the second orifice 35 into the prechamber.

The injection of the charge occurs very shortly after the beginning of fuel injection and therafter the burning of the charge continues at a rate essentially controlled by the rate of fuel injection into the prechamber in much the same manner as occurs in diesel engines. The amount of fuel injected is controlled by varying the length of the injection period. During and following combustion, the gases expand into the main chamber forcing the piston downward. Subsequently, on the next upward piston stroke, the burned products are exhausted through the exhaust valve provided in the main chamber.

In tests of an engine having essentially the form described above and shown in FIGS. 1 and 2 reliable ignition was obtained over widely varying load conditions without throttling. Pertinent dimensions of the elements of this test engine were as follows:

| | |
|---|---|
| Piston displacement | 57 in$^3$ |
| Main combustion minimum volume | 3.8 in$^3$ |
| Prechamber volume | 3.66 in$^3$ |
| Antechamber volume (with injector and spark plug installed) | 0.415 in$^3$ |
| Main orifice diameter | ⅜ inch |
| First antechamber orifice diameter | ⅛ inch |
| Second antechamber orifice diameter | ⅛ inch |
| Single hole pencil type injector nozzle was positioned .07 inches from the inner edge of the first antechamber orifice. | |

Figure 3:
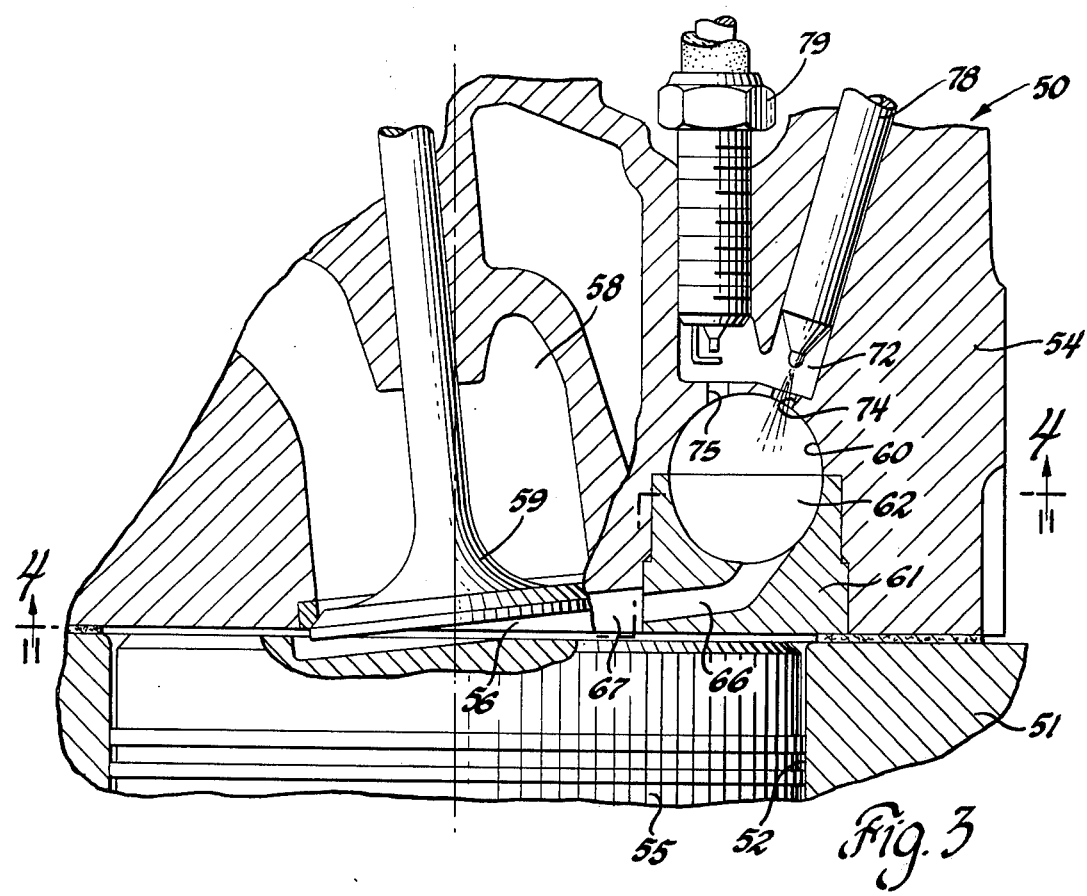
FIG. 3 is a fragmentary transverse cross-sectional view through an alternative embodiment of engine formed according to the invention.
Figure 4:
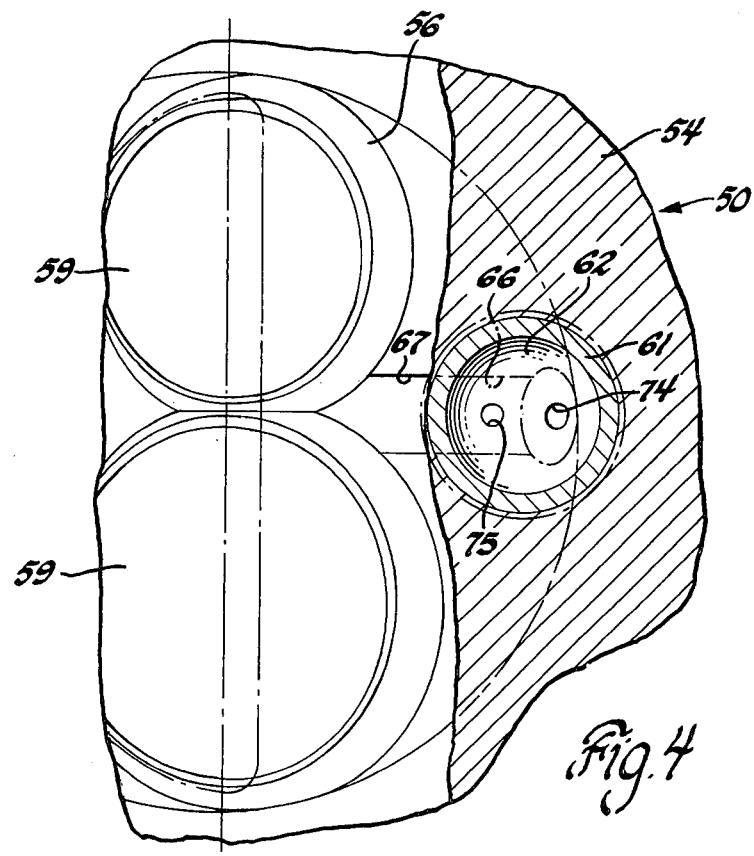
FIG. 4 is a cross-sectional view through the main and precombustion chambers of the engine of FIG. 3 taken in the plane generally indicated by the line 4—4.

Referring now to FIGS. 3 and 4 of the drawings, there is shown an alternative embodiment of mixed cycle engine generally indicated by numeral 50 and having general design characteristics based upon a prechamber type diesel engine.

Engine 50 has a cylinder block 51, defining a plurality of cylinders 52, closed by a cylinder head 54 and carrying reciprocable pistons 55 defining main combustion chambers 56. Ports 58 and valves 59 in the cylinder head control the admission of air to and exhaust of combustion products from the chambers 56. At each cylinder location, the cylinder head includes a recess 60 that is closed by a plug 61 to define a prechamber 62 having a volume approximately equal to that of the associated main chamber 56. These chambers are connected by an elongated passage 66 that extends from a channel 67 in the cylinder head surface to a tangential entry into the prechamber 62 so as to create a turbulent swirling flow of air therein during the piston compression stroke.

Adjacent the prechamber and within the cylinder head there is formed a small ignition antechamber 72 having first and second orifices 74, 75 connecting it with the prechamber 62. A fuel injection nozzle 78 and a spark plug 79 are seated in the head and terminate in the antechamber 72, the single hole tip of the injection nozzle 78 being disposed opposite the first orifice 34 in position to direct a spray of fuel through the orifice into the prechamber 62.

From the foregoing description it may be seen that, although the physical relationship and combustion chamber design vary somewhat from the embodiment first described, the overall arrangement of the elements in the two embodiments is is similar. Thus it is apparent that operation of the embodiment of FIGS. 3 and 4 is identical to that described for the embodiment of FIGS. 1 and 2, and a specific description is not deemed necessary.

While the invention has been described by reference to certain specific embodiments chosen for purposes of illustration, it should be understood that numerous changes could be made within the scope of the inventive concepts contained in the described embodiments. Accordingly, it is intended that the invention not be limited to the specific embodiments described, but that it have the full scope permitted by the language of the following claims.

What is claimed is:

1. The combination in an internal combustion engine of means defining a variable volume main combustion chamber, a constant volume high turbulence prechamber adjacent to and connected with said main chamber, a fixed volume low turbulence ignition antechamber at one side of said prechamber and connected therewith by an orifice, high pressure fuel injection means in said antechamber and arranged to inject the total combustion chamber fuel charge in a jet aimed from the antechamber through said orifice beginning at a time during contraction of the main chamber near its minimum volume condition, said fuel charge being directed such that a portion thereof is retained in the antechamber by air flow being forced through the orifice from the prechamber while the remainder of the fuel charge jet passes through the orifice for mixing with air in the prechamber, and spark ignition means in the antechamber and operative to ignite the low turbulence air-fuel mixture formed therein during a period of relatively constant air-fuel ratio near the beginning of the fuel injection period whereby combustion in the ignition chamber forces a jet of burning gases through the antechamber orifice to ignite the turbulent fuel-air charge in the prechamber.

2. The combination of claim 1 wherein the minimum volume of the main combustion chamber and the volume of the prechamber are about equal, while the ignition antechamber is less than one fourth the size of the prechamber.

3. The combination of claim 2 wherein said orifice is only slightly larger than the width of the fuel charge jet directed therethrough to control the retention of injected fuel in the antechamber, and a second orifice is provided connecting said prechamber and said antechamber and sized to limit antechamber combustion pressures and pumping losses.

* * * * *

UNITED STATES PATENT AND TRADEMARK OFFICE
CERTIFICATE OF CORRECTION

PATENT NO. : 4,124,000
DATED : November 7, 1978
INVENTOR(S) : Stanley L. Genslak It is certified that error appears in the above-identified patent and that said Letters Patent are hereby corrected as shown below:

Column 1, line 36, "after" should be --about--.

Column 2, line 56, "of" (second occurrence) should be --or--.

Column 3, line 64, "therafter" should be --thereafter--.

Column 4, line 14, "combustion minimum" should read --combustion chamber minimum--.

Signed and Sealed this

Fourth Day of March 1980

[SEAL]

Attest:

Attesting Officer

SIDNEY A. DIAMOND

Commissioner of Patents and Trademarks